(12) United States Patent
Herzog et al.

(10) Patent No.: US 10,220,878 B2
(45) Date of Patent: Mar. 5, 2019

(54) MAXIMUM HITCH ANGLE CONTROL FOR REVERSING A VEHICLE AND TRAILER SYSTEM

(71) Applicant: Continental Automotive Systems, Inc., Auburn Hills, MI (US)

(72) Inventors: Brandon Herzog, Waterford, MI (US); Ibro Muharemovic, Warren, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 15/361,614

(22) Filed: Nov. 28, 2016

(65) Prior Publication Data

US 2017/0158233 A1 Jun. 8, 2017

Related U.S. Application Data

(60) Provisional application No. 62/263,186, filed on Dec. 4, 2015.

(51) Int. Cl.

| | |
|---|---|
| *B62D 13/06* | (2006.01) |
| *B60K 37/06* | (2006.01) |
| *B60R 11/04* | (2006.01) |
| *B60D 1/62* | (2006.01) |
| *B62D 1/28* | (2006.01) |
| *B60D 1/24* | (2006.01) |
| *B62D 15/02* | (2006.01) |
| *B62D 1/12* | (2006.01) |

(52) U.S. Cl.
CPC .......... *B62D 13/06* (2013.01); *B60D 1/245* (2013.01); *B60D 1/62* (2013.01); *B60K 37/06* (2013.01); *B60R 11/04* (2013.01); *B62D 1/12* (2013.01); *B62D 1/286* (2013.01); *B62D 15/024* (2013.01); *B60K 2350/1028* (2013.01); *B60K 2350/1044* (2013.01); *B60K 2350/1052* (2013.01)

(58) Field of Classification Search
None
See application file for complete search history.

(56) References Cited

U.S. PATENT DOCUMENTS

2014/0249723 A1* 9/2014 Pilutti .................. B62D 15/027
701/42
2015/0367886 A1* 12/2015 Lavoie ................... B62D 13/06
701/41

FOREIGN PATENT DOCUMENTS

WO 2014174037 A1 10/2014

OTHER PUBLICATIONS

International Search Report and Written Opinion of the International Searching Authority dated Mar. 13, 2017 from corresponding International Patent Application No. PCT/US2016/064552.

* cited by examiner

*Primary Examiner* — Lail A Kleinman

(57) ABSTRACT

A backing system for a vehicle-trailer unit includes an input device for providing a input used to determine a first and second requested hitch angle. The first hitch angle is disposed within a standard range of motion of the input device while the second hitch angle is disposed within a maximum range of motion, different from the standard range of motion. Movement of the input device in the standard range of motion limits the requested hitch angle to a first maximum value to prevent jack-knifing of the vehicle-trailer unit. However, movement of the input device in the maximum range of motion does not limit the actual hitch angle.

6 Claims, 5 Drawing Sheets

MAXIMUM HITCH ANGLE CONTROL FOR REVERSING A VEHICLE AND TRAILER SYSTEM

CROSS REFERENCE TO RELATED APPLICATION

This application claims the benefit of provisional patent application No. 62/263,186, filed Dec. 4, 2015, which is hereby incorporated by reference.

TECHNICAL FIELD

The present invention is related to a method, system and electronic processing device for maneuvering a towing vehicle and a connected trailer when the vehicle-trailer unit is in the process of backing up.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one exemplary embodiment, a method of maneuvering a vehicle-trailer unit in reverse travel with a backing system is described herein. The trailer has a front with a trailer tongue and the vehicle has a rear with a trailer hitch. The trailer tongue is connected to the trailer hitch allowing a horizontal swivel movement of the trailer around the hitch. The method includes determining that the vehicle-trailer unit is backing up with an electronic control unit for the backing system. The method also includes determining a current hitch angle representing the relative angle between the vehicle and the trailer with the electronic control unit. The method further includes inputting a first requested hitch angle with an input device connected to the electronic control unit by moving the input device within a standard range of motion. The method also includes calculating the first requested hitch angle with the electronic control unit based on the movement of the input device within the standard range of motion, wherein the standard range of motion limits the requested hitch angle to a first maximum value to prevent jack-knifing of the vehicle-trailer unit. The method also includes inputting a second requested hitch angle with the input device connected to the electronic control unit by moving the input device within a maximum range of motion. The method further includes calculating the second requested hitch angle with the electronic control unit, based on the movement of the input device within the maximum range of motion, wherein the maximum range of motion does not limit the actual hitch angle. The method includes calculating a steering angle with the electronic control unit based upon one of the first and second requested hitch angles, wherein the steering angle will allow movement of the vehicle-trailer unit in the reverse direction to obtain the first and second requested hitch angle. The method also includes sending a request to a steering system to provide the steering angle.

A backing system for a vehicle-trailer unit, according to one exemplarly embodiments, is also described herein. The vehicle-trailer unit includes a trailer having a front with a trailer tongue and a vehicle has a rear with a trailer hitch. The trailer tongue is connected to the trailer hitch allowing a horizontal swivel movement of the trailer around the hitch. The backing system includes a sensor for sensing a current hitch angle, which represents the relative angle between the vehicle and the trailer. The system also includes an input device for providing a input used to determine a first and second requested hitch angle. An electronic control unit for the backing system is in communication with the sensor and the input device. The electronic control unit includes instructions for determining that the vehicle-trailer unit is backing up, receiving the current hitch angle from the sensor, and calculating the first requested hitch angle, based on the movement of the input device within a standard range of motion, wherein the standard range of motion limits the requested hitch angle to a first maximum value to prevent jack-knifing of the vehicle-trailer unit. The electronic control unit also includes instructions for calculating the second requested hitch angle, based on the movement of the input device within a maximum range of motion, wherein the maximum range of motion does not limit the actual hitch angle, calculating a steering angle with the electronic control unit based upon one of the first and second requested hitch angles, wherein the steering angle will allow movement of the vehicle-trailer unit in the reverse direction to obtain the one of the first and second requested hitch angle, and sending a request to a steering system to provide the steering angle.

BRIEF DESCRIPTION OF THE DRAWINGS

The present disclosure will become more fully understood from the detailed description and the accompanying drawings, wherein.

DETAILED DESCRIPTION

Figure 1:
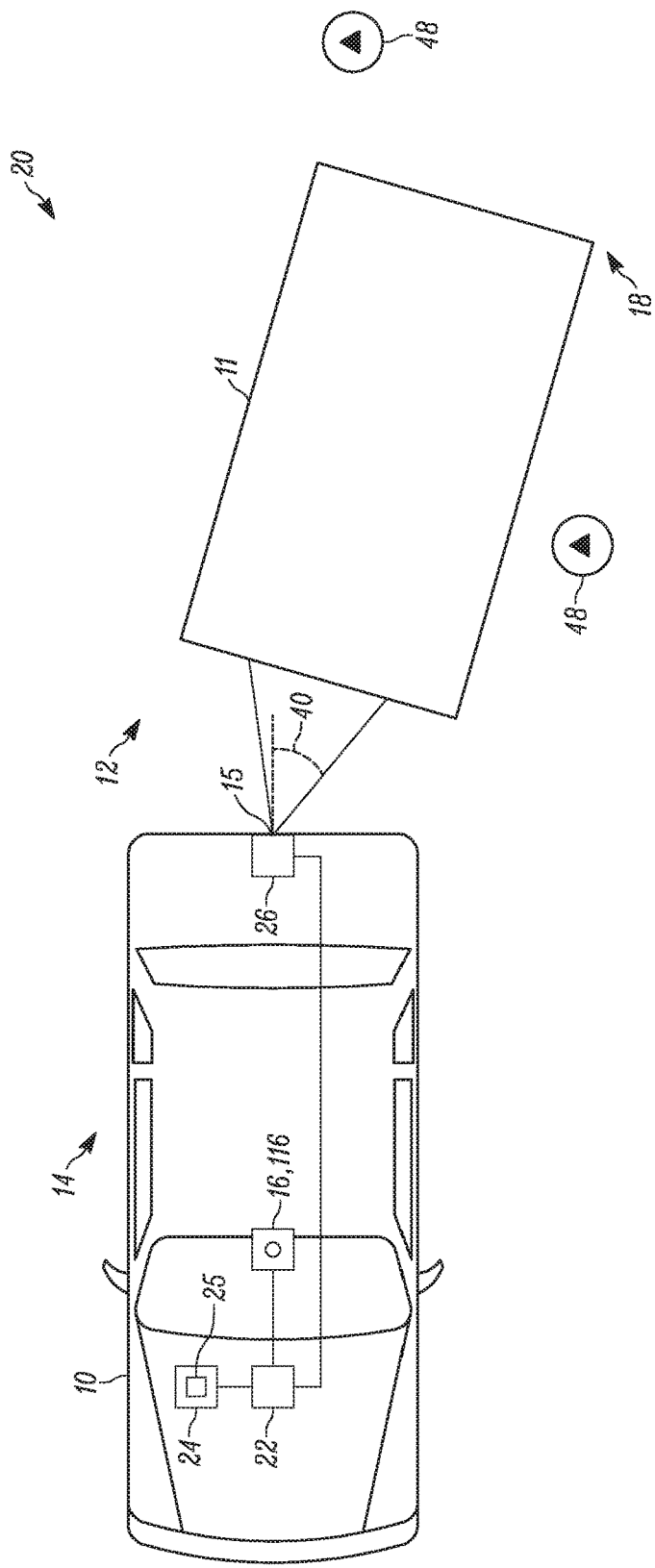
FIG. 1 is a schematic diagram of one exemplary embodiment of a vehicle-trailer unit having a trailer backing system.

The following description is merely exemplary in nature and is in no way intended to limit the disclosure, its application, or uses. For purposes of clarity, the same reference numbers will be used in the drawings to identify similar elements.

FIG. 1 illustrates a vehicle 10 and a trailer 11 according to one exemplary embodiment. The trailer 11 is controllably secured to the vehicle 10 to form a vehicle-trailer unit 12. The vehicle-trailer unit 12 utilizes a trailer backing system 14 of the present invention. Throughout the application the relative directions of forward and rear are in reference to the direction which an operator for the vehicle 10 would typically be facing when operating the vehicle 10 in a drive gear on a public road. Therefore, in operation of the trailer backing system 14 the vehicle 10 would be in a reverse gear and the operator may be facing backward. The trailer backing system 14 provides the vehicle operator with a method of electronically defining an intended backing direction 18 of the vehicle-trailer unit 12. The trailer backing system 14 utilizes the intended backing path 18 to control movement of vehicle-trailer unit 12.

Referring to FIGS. 1-4, arrangement and method for utilizing the trailer backing system 14 is described. The trailer 11 is connected to the vehicle 10 through trailer hitch 15, which allows the trailer to swivel horizontally around the vertical axis of the trailer hitch 15, which is the axis vertical to the drawing plane. An input device 16 is electronically connected to the vehicle 10 and the trailer backing system 14. The trailer backing system 14 includes an electronic control unit ("ECU") 22. The ECU 22 may be connected to at least one vehicle system 24 such as a steering system. The steering system is configured to receive inputs regarding the turning of at least one wheel of the vehicle and to actuate movement of the at least one wheel in accordance with the received inputs. Other vehicle systems (not shown), such as powertrain and/or a brake systems to control and direct movement of the vehicle-trailer unit 12 may also be connected to the control unit 22.

The ECU 22 communicates with a control module 25 for the steering system 24. The control module 25 is an electronic processing unit controlling an active power steering system 24 that is capable of actively changing a steering angle of front axle wheels without the vehicle driver giving a respective input through the vehicle steering wheel. The active power steering system 24 may also include the capability of additionally steering the rear axle wheels. The control module 25 computes corrective actions to be taken in order to maneuver the vehicle and initiates the power steering system 24 accordingly. Thus, the control unit 22 sends instructions to the steering system 24 to move the vehicle-trailer unit 12 based upon the input from the control unit 22.

A sensor 26 and the input device 16 are connected to the ECU 22. The input device 16 and a sensor 26 may already be existing and incorporated into the vehicle 10. The input device 16 may be one of a joystick, a roller ball, a knob, a slide device, at least one physical button, at least one touch screen button, a handheld electronic device, gesture control inputs and voice control inputs. For example, the input device 16 may be a knob style controller that is used with a navigation/information system, or a separate portable device that may be removed from the vehicle 10 and connected wirelessly to the ECU 22. Alternatively, the input device 16 may be a hand-held device where inputting a requested hitch angle comprises pivoting the hand-held display toward the desired direction of travel and the electronic control unit determines an angle of the hand-held device relative to horizontal based upon input from a gyroscope within the hand-held device.

The sensor 26 may be used to measure hitch angle of the vehicle 10. The sensor 26 may be one or multiple sensors measuring relative distance between the vehicle 10 and the trailer 11 and using the varied distance to calculate hitch angle 40. The sensor 26 may use horizontal or vertical features on the trailer 11 in the distance measurement.

In one embodiment, the sensor 26 is a camera, preferably a camera (not separately numbered) which is installed in the vehicle 10, such as a back-up camera. The camera may capture an image and image analysis may be used to calculate the hitch angle 40. A distinct marking can be established on the trailer 11 and captured by the camera for analysis. For example, the marking may be three or more of dots spaced apart from one another and positioned on the front of the trailer 11 proximate to the hitch 15. The camera 26 may capture an image of the marking and the ECU 22 may analyze the image to determine the relative position of the dots to one another. The ECU 22 compares the relative distances of the dots and to stored data of the relative distances. The stored data would include at what hitch angle 40 those relative distances would occur. Thus, the hitch angle can be calculated using a camera for the sensor 26 and a predetermined distinct marking. The marking may be specific to the trailer backing system 14, e.g., a known decal to be applied to the trailer 11, since the relative distances of the markings may be prerecorded by the ECU 22. The distance to the marking from the camera 16 may also need to be input into the system 14.

In another embodiment, the trailer backing system 14 can use reference points on the trailer 11 as markings, such as the corners of the trailer, hitch attachment point, body decals that are provided by the manufacturer, etc. The ECU 22 may employ a learning mode to learn the relative distances at known hitch angles 40 the first time the system 14 is used. The trailer backing system 14 could learn the relative distances between the markings when the trailer 11 is hitched to the vehicle 10 and at a known angle, e.g., zero degrees hitch angle.

Figure 2:
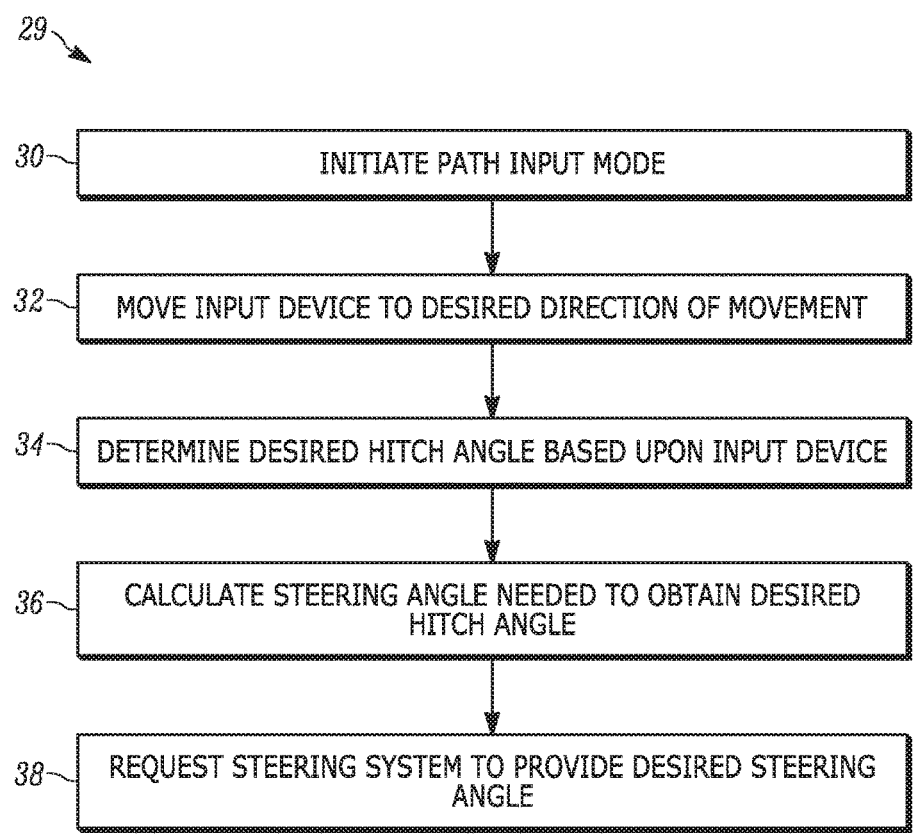
FIG. 2 is a flow chart of a method of utilizing the trailer backing system of according to one exemplary embodiment.

FIG. 2 illustrates an embodiment of a method of using the trailer backing system 14, shown at 29. The path input mode for the trailer backing system 14 is initiated, step 30. A vehicle operator would use the input device 16 to input an intended direction of moving the trailer 11, step 32. The ECU 22 interprets the joystick 116 movement to a steering angle required, step 34.

The trailer backing system 14 is designed to work real-time in which the vehicle-trailer unit 12 moves as the user inputs the directions through the input device 16, step 36. If the actual angle between the vehicle and the trailer differs from an intended angle by an amount greater than a stored threshold value, the power steering system 24 applies a corrective steering angle. The threshold value corresponds to a difference caused by a relatively small angle of at most 10°. The smaller the stored threshold value is, the more sensitive the control will be. The exact threshold value may be empirically determined to best satisfy a driver's need. It could also be set by the driver of the respective vehicle 10.

Figure 3A:
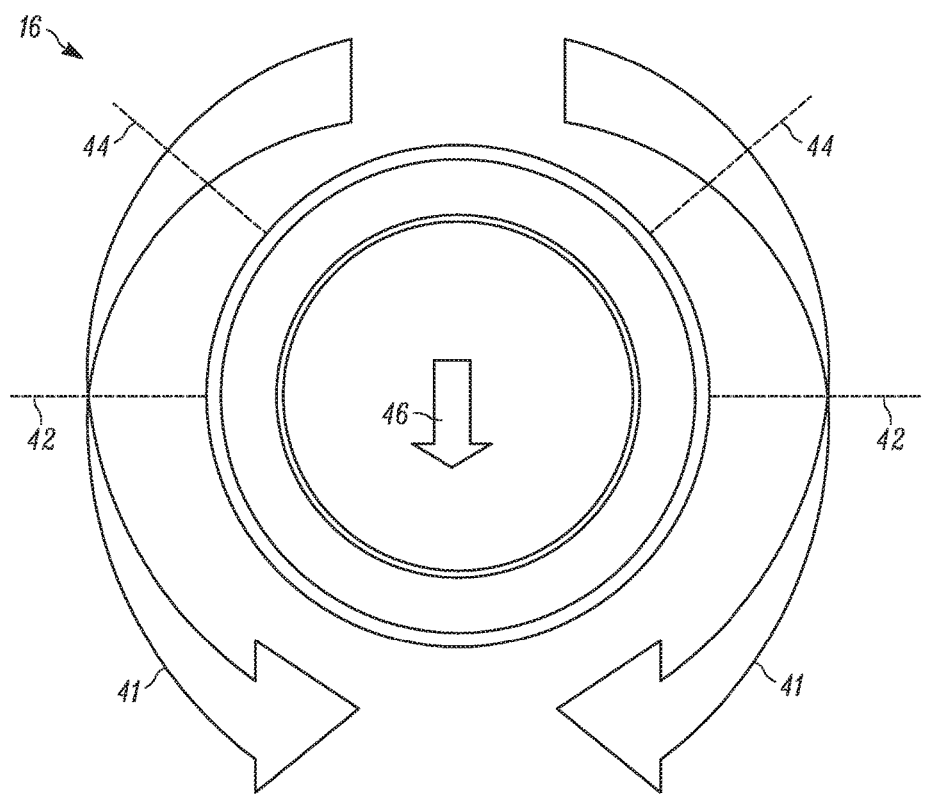
FIG. 3a is a schematic illustration of a knob style controller according to one exemplary embodiment for providing maximum hitch angle control of the trailer backing system.
Figure 3B:
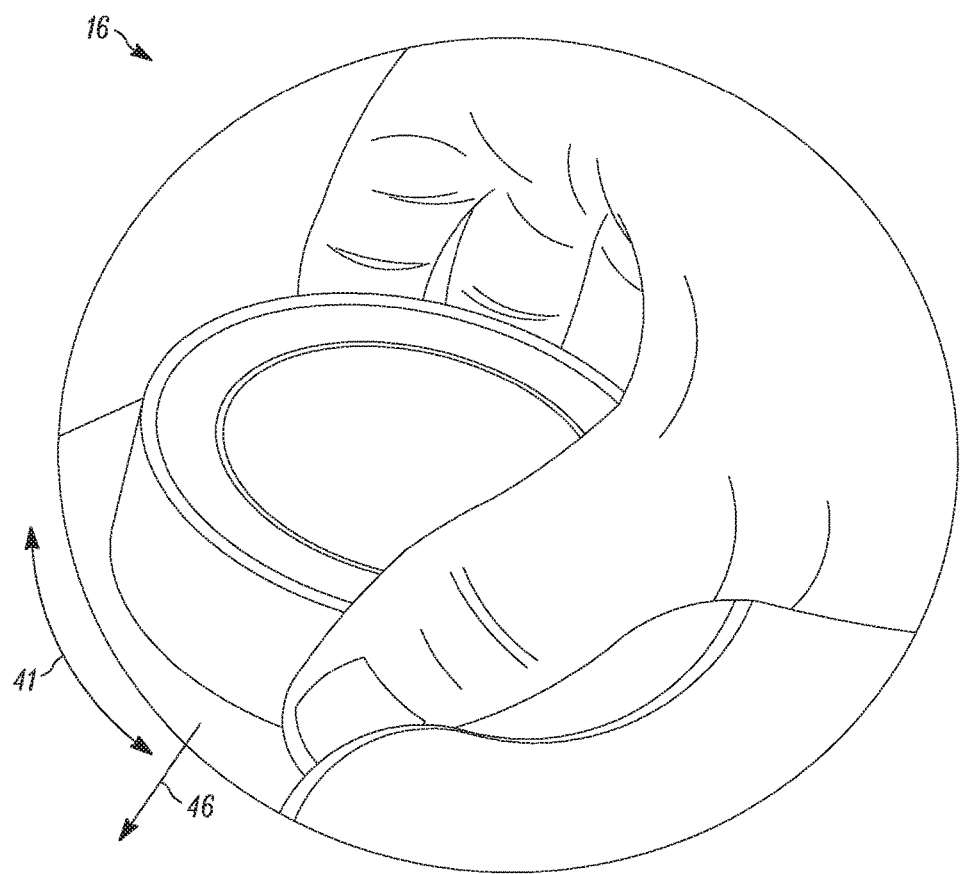
FIG. 3b is a perspective view of a knob style controller according to one exemplary embodiment for providing maximum hitch angle control of the trailer backing system.

FIGS. 3a and 3b illustrate an input device 16, where the device is a knob style control. The ECU 22 receives control signals from the knob 16 based on movement of the knob 16 to the right and left and interprets the movement to begin a steering request in the direction chosen. Anti-jack knife measures will limit the maximum hitch angle to either side. The knob 16 has an available range of motion 41. Within the available range of motion 41 is a limited standard available motion between dotted lines 44. When the knob 16 is in the standard available range of motion 44 the backing system 14 limits the maximum hitch angle of the vehicle-trailer unit 12 backing up to prevent jack-knifing. The standard range of motion 44, could be, e.g., 25-35% of an available maximum range of motion. This feature is particularly important for individuals who are unfamiliar with backing trailers 11, when inadvertent jack-knifing of the trailer 11 may occur.

However, situations may occur when range of motion greater than the standard range of motion 44 is desired and the anti-jack knife measures can be overridden. For example, an experienced user may desire a hitch angle 40 to avoid an obstacle 48 (as shown in FIG. 1), where the desired hitch angle is outside the standard range of motion 44. In such instances, a maximum range of motion of the knob, as shown between the dotted lines 42, may be implemented. The user may override the standard available range of motion 44 to allow the maximum range of motion 42 by, e.g., pressing downward 46 while simultaneously moving the knob 16 further in the desired direction 41. Of course, in other embodiments, instead of pressing downward 46, the knob may be moved in some other direction, e.g., left, right, upward, etc.

The ECU 22 receives control signals to allow the hitch angle 40 to move to a full extent of the range of motion available, when the knob 16 is moved past the standard range of motion 44 and into the maximum range of motion 42. The movement of the input device 16 would still have the same rate of requested change, e.g., turning the knob 5 degrees would still request a 5% increase in hitch angle, but would now allow the requested hitch angle to extend through a greater range of motion.

A method of controlling the vehicle-trailer unit 12 with the backing system 14 would include the ECU 22 determining a position of the knob relative to the standard range of motion of the knob 16, and requesting a hitch angle based on the position of the knob 16, where in the standard range of motion limits the hitch angle to a first maximum value, and moving a knob 16 to a maximum range of motion to request a second hitch angle, wherein the second hitch angle is a second maximum value. The second maximum value is the maximum hitch angle available for a vehicle-trailer unit 12. The backing system 14, wherein moving the knob to the maximum range of motion includes pressing downward while further moving the knob 16 in the desired direction of movement.

Figure 4A:
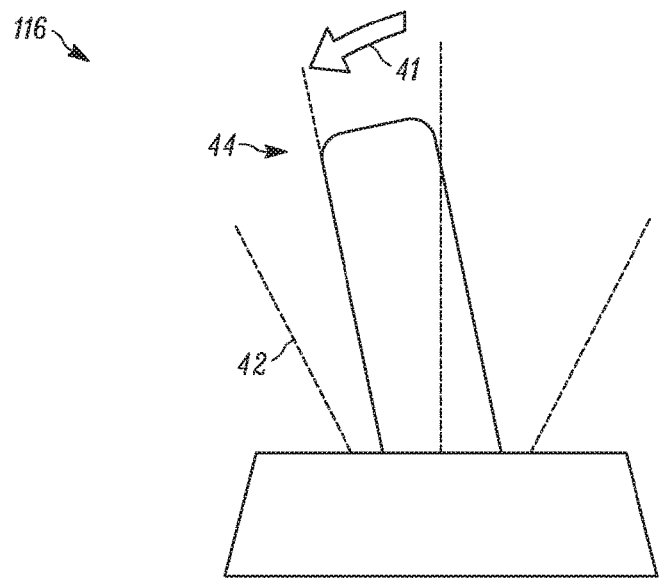
FIG. 4a is a schematic illustration of a joystick controller in a position providing standard hitch angle control of the trailer backing system according to one exemplary embodiment.
Figure 4B:
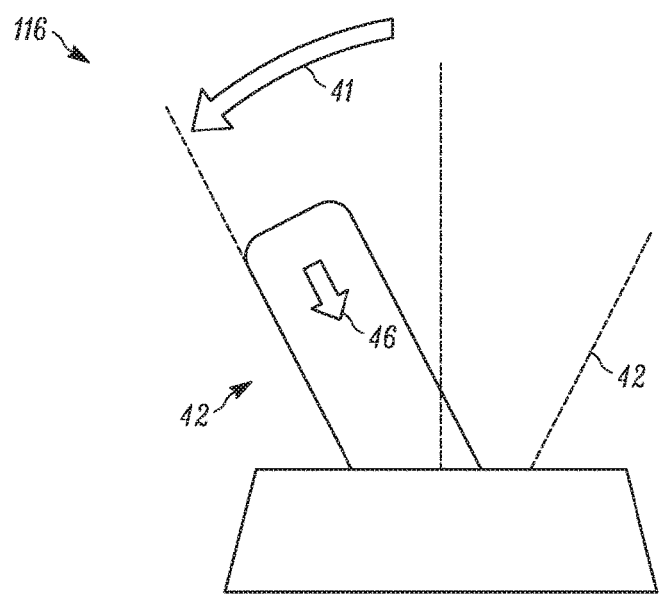
FIG. 4b is a schematic illustration of a joystick controller in a position providing maximum hitch angle control of the trailer backing system according to one exemplary embodiment.

FIGS. 4A and 4B illustrate an input device 116, where the input device 116 is a joystick (not separately numbered) or lever. The ECU 22 receives control signals from the input device 116 based on movement of the input device 116 to the right and left and interprets the movement to begin a steering request in the direction chosen. Anti-jack knife measures will limit the maximum hitch angle to either side. The input device 116 has an available range of motion 41. In FIG. 4A, the input device 116 is shown at a first position, which is the limit for a standard available motion 44. When the input device 116 is in the standard available range of motion 44 the backing system 14 limits the maximum hitch angle of the vehicle-trailer unit 12 backing up to prevent jack-knifing. This feature is particularly important for individuals who are unfamiliar with backing trailers 11, when inadvertent jack-knifing of the trailer 11 may occur.

However, situations may occur when greater range of motion is desired and the anti-jack knife measures can be overridden. For example, an experienced user may desired hitch angle 40 to avoid an obstacle 48, where the desired hitch angle is outside the standard range of motion 44. In such instances a maximum range of motion 42 of the joystick may be used. The user may override the standard available range of motion 44 to allow the maximum range of motion 42 by pressing downward while simultaneously moving the input device 116 further in the desired direction, as shown in FIG. 4B. Accordingly, the ECU 22 receives control signals to allow the hitch angle 40 to move to a full extent of the range of motion available.

A method of controlling the vehicle-trailer unit 12 with the backing system 14 would include the ECU 22 determining a position of the joystick relative to the standard range of motion of the input device 116, and requesting a hitch angle based on the position of the input device 116, where in the standard range of motion limits the hitch angle to a first maximum value, and moving the input device 116 to a maximum range of motion to request a second hitch angle, wherein the second hitch angle is a second maximum value. The second maximum value is the maximum hitch angle available for a vehicle-trailer unit 14. Moving the joystick to the maximum range of motion includes pressing downward while further moving the joystick in the desired direction of movement.

When the input device 16, 116 is a hand-held device the standard range motion can be requested by pivoting the hand-held display toward the desired direction of travel and the maximum range of motion can be requested by pressing and holding a button on the hand-held display while continuing to pivot the hand-held display toward the desired direction of travel.

The input device 16, 116 may be a proportional or differential input device 16, 116. That is the ECU 22 may provide proportional degrees of change based upon the position of the input device 16, 116 to the range of motion, e.g. every 10% change in one direction of the range of motion results in a 5 degree change in the requested hitch angle and maintains the joystick at the zero degree position maintains a current hitch angle. The differential change may be incrementally or continuously variable.

Alternatively, the input device 16, 116 may be a proportional input device where the input device 16, 116 outputs a requested trailer angle based on knob/joystick position and straight up indicates straight backing motion. For example, the input device 16, 116 may be moved to the end of travel in the right direction and held there. The ECU 22 will interpret this as a request to steer to the maximum allowed angle and hold that angle while the input device 16, 116 remains in place.

While the figures show the ECU 22 separate from the control module 25 and from the power steering system 24, these modules can obviously be integrated into processing units cooperating to perform the described functions. The ECU 22 can, therefore, be an after-market add-on While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of maneuvering a vehicle-trailer unit in a reverse direction of travel with a backing system, wherein the trailer has a front with a trailer tongue and the vehicle has a rear with a trailer hitch, the trailer tongue being connected to the trailer hitch allowing a horizontal swivel movement of the trailer around the hitch, the method comprising:
   determining that the vehicle-trailer unit is backing up with an electronic control unit for the backing system;
   determining a current hitch angle representing a relative angle between the vehicle and the trailer with the electronic control unit;
   inputting a first requested hitch angle with an input device being a hand-held display connected to the electronic control unit by moving the input device within a standard range of motion by way of pivoting the hand-held display toward a desired direction of travel;
   calculating the first requested hitch angle with the electronic control unit based on the movement of the input device within the standard range of motion, wherein the standard range of motion limits the requested hitch angle to a first maximum value to prevent jack-knifing of the vehicle-trailer unit;
   inputting a second requested hitch angle with the input device connected to the electronic control unit by moving the input device within a maximum range of motion by way of pressing and hold a button on the hand-held display while continuing to pivot the hand-held display toward the desired direction of travel;
   calculating the second requested hitch angle with the electronic control unit, based on the movement of the input device within the maximum range of motion, wherein the maximum range of motion does not limit the actual hitch angle;
   for each one of the first and second requested hitch angle, calculating a steering angle with the electronic control unit based upon one of the first and second requested hitch angles, wherein the steering angle will allow movement of the vehicle-trailer unit in the reverse direction to obtain the one of the first and second requested hitch angle; and
   sending a request to a steering system to provide the steering angle.

2. The method of claim 1, further comprising continuing calculating the steering angle to provide the first and second requested hitch angles while the vehicle-trailer unit is moving in the reverse direction, and continuing to send the requests to the steering system.

3. The method of claim 1, wherein moving the input device within the standard range of motion and maximum range of motion further comprises the electronic control unit determines an angle of the hand-held device relative to horizontal based upon input from a gyroscope within the hand-held device.

4. A backing system for a vehicle-trailer unit, wherein the trailer has a front with a trailer tongue and the vehicle has a rear with a trailer hitch, the trailer tongue being connected to the trailer hitch allowing a horizontal swivel movement of the trailer around the hitch, the system comprising:
   a sensor for sensing a current hitch angle, which represents a relative angle between the vehicle and the trailer;
   an input device including a hand-held display for providing an input used to determine a first and second requested hitch angle, wherein:
      for determining the first requested hitch angle, the input includes pivoting the hand-held display toward a desired direction of travel, and
      for determining the second requested hitch angle, pressing and holding a button on the hand-held display while continuing to pivot the hand-held display toward the desired direction of travel; and
   an electronic control unit for the backing system, the electronic control unit in communication with the sensor and the input device, wherein the electronic control unit includes instructions for:
      determining that the vehicle-trailer unit is backing up;
      receiving the current hitch angle from the sensor;
      calculating the first requested hitch angle, based on the movement of the input device within a standard range of motion, wherein the standard range of motion limits the requested hitch angle to a first maximum value to prevent jack-knifing of the vehicle-trailer unit;
      calculating the second requested hitch angle, based on the movement of the input device within a maximum range of motion, wherein the maximum range of motion does not limit the actual hitch angle;
      for each one of the first and second requested hitch angle, calculating a steering angle with the electronic control unit based upon one of the first and second requested hitch angles, wherein the steering angle will allow movement of the vehicle-trailer unit in a reverse direction to obtain the one of the one of the first and second requested hitch angle; and
      sending a request to a steering system to provide the steering angle.

5. The backing system of claim 4, wherein the electronic control device includes instructions for: continuing calculating the steering angle to provide the one of the first and second requested hitch angles while the vehicle-trailer unit is moving in the reverse direction, and continuing to send the requests to the steering system.

6. The backing system of claim 4, wherein the electronic control unit determines an angle of the hand-held device relative to horizontal based upon input from a gyroscope to determine movement of the input device within the standard range of motion and the maximum range of motion.

* * * * *